Patented June 13, 1944

2,351,555

UNITED STATES PATENT OFFICE 2,351,555

MANUFACTURE OF GAS-EXPANDED RUBBER PRODUCTS

Wendell V. Smith, Nutley, N. J., assignor to United States Rubber Company, New York, N. Y., a corporation of New Jersey No Drawing. Application September 19, 1940, Serial No. 357,408

4 Claims. (Cl. 260—724)

The present invention relates to chemicals, suitable as chemical blowing or gassing agents for generating or liberating nitrogen gas, and useful particularly for the making of gas-expanded rubber products of both the cellular and the sponge types.

This case is a continuation-in-part of application Serial No. 308,957, filed Dec. 13, 1939, now U. S. Patent No. 2,285,843, dated June 9, 1942.

An object of the invention is to obtain concentrated ammonium nitrite, in the fluid state as a concentrated aqueous solution, in the solid state as crystalline ammonium nitrite, and as the complex salt of zinc having the probable formula $Zn(NH_3)_2(NO_2)_2$. Other objects will be apparent from the following description.

Ammonium nitrite has heretofore been obtained by evaporating and subliming in vacuo concentrated solutions of a mixture of ammonium chloride and sodium or potassium nitrite (J. W. Mellor "A Comprehensive Treatise on Inorganic and Theoretical Chemistry"; 1928; Longmans, Green and Co., New York, vol. VIII, p. 470). This practice, involving interaction of the ammonium chloride and alkali metal nitrite to form ammonium nitrite and alkali-metal chloride, is relatively costly and the yield of the concentrate somewhat limited, the ammonium nitrite having a tendency to decompose as it is formed, thereby requiring its preparation under definitely controlled conditions.

It has now been found that by reacting ammonium sulphate distinct advantages are obtainable over ammonium chloride. By utilizing its greater solubility in an ammoniacal solution together with the lower solubility of sodium or potassium sulphate formed therefrom (compared to above sodium or potassium chloride), a more concentrated solution of ammonium nitrite may be prepared and a better separation of the ammonium nitrite solution from the other salt (alkali-metal sulphate) produced in the double decomposition reaction results. By using ammonium sulphate, the ammonium nitrite solution can be prepared sufficiently concentrated to permit crystallization of the ammonium nitrite from the solution by cooling with ice or other agency, as distinguished from crystallization by evaporation of the solution. The concentrated ammonium nitrite solution also provides a means of forming a new gassing agent useful for making gas-expanded rubber, and which is a solid complex zinc diammonia nitrite.

The present gassing agents liberate nitrogen which is a most useful gas for making expanded rubber products since it diffuses so slowly through rubber, compared with gases like carbon dioxide and ammonia, thereby preventing collapse of the rubber which is an important item in making cellular rubber. The new gassing agent, zinc diammonia nitrite, is associated with little or no sodium salts, and the rubber accordingly has better ageing properties and lower water absorption.

The following examples are given to illustrate the invention:

*Example A—Preparation of concentrated aqueous solutions of ammonium nitrite*

The method comprises treating solid ammonium sulfate and solid sodium nitrite, in the approximate ratio of 1 to 2 moles respectively, with water containing dissolved ammonia. The amount of water may be regulated to give a solution of the desired concentration. When these are mixed a double decomposition takes place, and in the presence of only a limited amount of water, two phases are present, a solid and a liquid phase. The solid phase is rich in sodium sulfate and the liquid phase is rich in ammonium nitrite. Thus, by separating the two phases, a solution consisting of water, ammonia, ammonium nitrite and a small amount of sodium sulfate is obtained. The ratio of sodium sulfate to ammonium nitrite in the solution is small if a limited amount of water is used in the preparation. Heat may be applied to the mixture before separating the two phases in order to hasten the double decomposition.

A specific example to illustrate this preparation is as follows (parts are by weight):

| Mix | Parts |
|---|---|
| Solid $(NH_4)_2SO_4$ | 37 |
| Solid $NaNO_2$ | 38.6 |
| Add | |
| 9% aqueous ammonia solution | 24.4 |

Heat to 60° C. and maintain at this temperature for one hour with occasional stirring. Separate the solid phase (principally $Na_2SO_4$) from the liquid phase by filtering. The liquid phase so obtained, which is the product of interest, is an ammoniacal water solution of ammonium nitrite containing sodium sulfate as an impurity. The ammonium nitrite concentration is between 50 and 60%, and the sodium sulfate about 10%.

*Example B—Preparation of solid ammonium nitrite (parts are by weight)*

The method involves cooling an ammoniacal water solution of ammonium nitrite containing more than 40% ammonium nitrite (such as that described above) to a temperature low enough to cause a solid phase to form. This solid phase consists principally of ammonium nitrite and may be separated from the liquid phase by any suitable method such as filtering. The liquid phase may be used in preparation (A) in place of the ammoniacal water solution.

A specific example which illustrates this method is as follows: 100 parts of an ammoniacal 57% solution of ammonium nitrite containing sodium sulfate as an impurity (preparation described in Example A) is cooled to −2° C. to induce crystallization, 41 parts of solid phase being thus formed. The solid phase is 75% ammonium nitrite and the remainder sodium sulfate.

*Example C—Zinc diammonia nitrite (parts are by weight)*

A concentrated solution of ammonium nitrite such as that described in Example A is treated with an amount of zinc oxide in excess of that necessary for the maintenance of a solid phase in equilibrium with the solution. A reaction takes place forming a new solid, zinc diammonia nitrite, the composition of which is expressed by the formula, believed to be as follows:

$$Zn(NH_3)_2(NO_2)_2$$

Too large a quantity of zinc oxide is to be avoided as it would only contaminate the solid product. The maximum quantity of zinc oxide which can be used without such contamination is determined by the original ammonium nitrite content of the solution and by the composition of the solution which is in equilibrium with the two solid phases, zinc diammonia nitrite and zinc oxide. This latter composition is a function both of temperature and of the initial free ammonia content.

A specific example which illustrates this preparation is as follows: to 100 parts of an ammoniacal 45% ammonium nitrite solution containing approximately 4½% of free ammonia, prepared as in Example A add 22.5 parts of zinc oxide. Stir for one hour to break up lumps of zinc oxide and thus bring about complete reaction. This produces 39 parts of the complex salt, zinc diammonia nitrite, as a solid phase which may be separated from the liquid phase by filtering. The liquid phase from this treatment contains about 29% ammonium nitrite. It can be enriched with respect to ammonium nitrite by using it in place of the ammoniacal solution in preparation Example A and the cycle repeated.

By starting with an ammonia solution as in Example A not substantially greater than 9%, very little ammonia is lost in preparing the ammonium nitrite solution, and the ammonia concentration of the resulting solution is such that a good yield of the product is obtained on the addition of the zinc oxide.

Chemical analysis of a sample of the zinc diammonia nitrite gives the following results:

|  | Analysis | Theoretical based on formula $Zn(NH_3)_2(NO_2)_2$ |
| --- | --- | --- |
|  | *Percent* | *Percent* |
| Zinc oxide | 41.7 | 42.3 |
| Total nitrogen | 28.5 | 29.3 |
| Ammonia | 17.0 | 17.8 |

The actual analysis lies between the compositions expressed by the formulas $Zn(NH_3)_2(NO_2)_2$ and $Zn(NH_3)_2(NO_2)_2 \cdot H_2O$, but nearer the former.

Each of the ammonium nitrite preparations of Examples A, B and C, above, evolves gases, principally nitrogen and water, when heated. Therefore, each may be used in rubber as the gas-producing substance in forming expanded rubber articles (soft, elastic or hard), either of the closed-cell type (cellular rubber) or of the interconnecting cell type (sponge). The substance is incorporated into the rubber along with the other necessary and desirable compounding ingredients, and the rubber mix is subjected to the usual control treatments to produce cellular rubber or sponge. The rubber may be natural rubber or artificial rubber including such synthetic rubbers as neoprene, and the various copolymers of butadiene rubber known as Buna co-polymers.

The following examples illustrate the production of gas-expanded rubber products, the parts being by weight:

*Example 1—Preparation of soft cellular rubber by the use of zinc diammonia nitrite*

Mix

| | |
| --- | --- |
| Pale crepe | 100 |
| Zinc soaps of cocoanut oil acids | 3 |
| Zinc oxide | 3 |
| Benzothiazyl disulfide | 1 |
| Tetramethyl triuram disulfide | .3 |
| Sulfur | 1 |
| Zinc diammonia nitrite oil paste[1] | 10 |
| Water | 1.2 |
| Antioxidant | 2 |

[1] Zinc diammonia nitrite paste is prepared by paint milling 3 parts zinc diammonia nitrite with 2 parts spindle oil.

A sufficient quantity of the above mix to fill the mold is placed in a frame mold 3/16″ thick of any desired area and is heated in a hydraulic platen press for 15 min. at 12 lbs. It is then cooled and removed from the mold, at which time expansion takes place due to nitrogen liberated from the zinc diammonia nitrite during heating. This expanded product is cut to fill a mold 3/8″ thick of any desired area and cured for 20 min. at 30 lbs. It is then cooled and removed from the mold. The product so obtained is cellular in structure, i. e. the cells are non-interconnecting.

*Example 2—Preparation of cellular neoprene (polychloroprene) by use of zinc diammonia nitrite*

Mix

| | |
| --- | --- |
| Neoprene GW | 100 |
| Diortho tolyl guanidine | 2 |
| Extra light calcined magnesia | 4 |
| Carbon black | 20 |
| Phenyl beta-naphthylamine | 1 |
| Zinc oxide | 5 |
| Zinc diammonia nitrite oil paste | 15 |
| Ammonia water 28% solution | 1.5 |

3,780 gm. of the above mix is placed in a 20 x 20 x 7/16″ frame mold and cured in a hydraulic platen press for 10 min. at 2.5# steam pressure and 10 min. at 12# steam pressure, then cooled and removed from the press. At this stage the product expands. The expanded product is cut to 2300 gm. weight, placed in a frame mold 36 x 36 x 1″, cured for 10 min. at 30# steam pressure and 60 min. at 90# steam pressure. It is cooled and removed from the mold, giving a cellular neoprene product.

*Example 3—Preparation of sponge, using zinc diammonia nitrite*

Mix

| | |
|---|---|
| Rubber | 50 |
| Reclaim | 150 |
| Zinc soaps of cocoanut oil acids | 4 |
| Zinc oxide | 6 |
| Antioxidant | .5 |
| Mercaptobenzothiazole | 1 |
| Tetramethyl thiuram disulfide | .2 |
| Sulfur | 4.5 |
| Zinc diammonia nitrite oil paste | 7 |
| Water | 3 |
| Bentonite | 10 |
| Whiting | 40 |
| Paraffin oil | 15 |

The above mix is calendered to .215″ gauge and cured in a frame mold 1″ thick with duck cloth on top and bottom.

The cure is 7 min. at 5# steam pressure and 15 min. at 45# steam pressure. This gives ordinary sponge of the interconnecting cell type.

Having thus described my invention, what I claim and desire to protect by Letters Patent is:

1. The process of producing gas-expanded rubber which comprises gas inflating the rubber by means of thermal decomposition products of zinc diammonia nitrite liberated within the rubber by heating the rubber composition containing the said zinc diammonia nitrite.

2. The process of producing gas-expanded rubber products which comprises incorporating in rubber, prior to gas inflating the rubber, zinc diammonia nitrite, and subsequently heating the mixture to liberate the gas, and vulcanizing the rubber.

3. A rubber composition comprising rubber and zinc diammonia nitrite.

4. The process of producing gas-expanded rubber products which comprises incorporating in a vulcanizable rubber composition, zinc diammonia nitrite and heating the mixture.

WENDELL V. SMITH.